United States Patent

Schumacher, II et al.

[11] 3,913,306
[45] Oct. 21, 1975

[54] HARVESTER ATTACHMENT HAVING A RESILIENTLY SUPPORTED TILTABLE SLIDE RAIL

[76] Inventors: Gustav Schumacher, II; Gunter Schumacher, both of Haus Nr. 51, 5231 Eichelhardt, Germany

[22] Filed: Jan. 7, 1975

[21] Appl. No.: 539,253

Related U.S. Application Data

[63] Continuation-in-part of Ser. No. 387,279, Aug. 10, 1973, abandoned.

[30] Foreign Application Priority Data

Aug. 24, 1972  Germany............................ 2241699

[52] U.S. Cl. ................................................. 56/313
[51] Int. Cl.² ........................................ A01D 65/02
[58] Field of Search ............................. 56/312–320

[56] References Cited
UNITED STATES PATENTS

| 1,105,084 | 7/1914 | Linn | 56/313 |
| 2,702,980 | 3/1955 | Pitner | 56/312 |

Primary Examiner—J. N. Eskovitz
Attorney, Agent, or Firm—Steinberg & Blake

[57] ABSTRACT

A ground skid attachment for mowers of harvesters. The attachment includes an elongated slide rail having an elongated intermediate substantially straight ground-engaging region and a pair of opposed front and end regions inclined upwardly from the substantially straight elongated intermediate region. A springy support leg has an upper rear portion capable of being attached to the mower of the harvester, and a front lower straight region which is fixed to an extends longitudinally along an upper surface of the intermediate region of the slide rail. Next to its front lower region, the springy support leg has an upwardly and rearwardly inclined region intersecting its front region at a predetermined angle which defines a pivot axis extending transversely across the slide rail for interconnecting the slide rail and springy support leg in such a way that they can turn one with respect to the other at this pivot axis. The latter pivot axis is situated forwardly of a central region of the elongated intermediate portion of the slide rail which is situated midway between the front and rear end regions thereof.

10 Claims, 6 Drawing Figures

HARVESTER ATTACHMENT HAVING A RESILIENTLY SUPPORTED TILTABLE SLIDE RAIL

CROSS REFERENCE TO RELATED APPLICATION

The present application is a continuation-in-part of copending application Ser. No. 387,279, filed Aug. 10, 1973, now abandoned, and entitled GROUND SKID FOR HARVESTER MOWERS.

BACKGROUND OF THE INVENTION

The present invention relates to a ground skid for harvester mowers, of the type which has a support leg connected to the mower and extending forwardly therefrom in the direction of travel of the mower while this support leg has attached thereto a ground-engaging slide rail which extends forwardly and rearwardly in the direction of travel, the slide rail having a rear end which may extend all the way back to or behind the cutting line.

Considerable difficulty has been encountered in guiding the relatively heavy cutter table of a combine harvester along the ground in such a way that it is capable of following irregularities which are unavoidably encountered in the surface of the ground. In the event that the weight pressing toward the ground is too great, the cutter mechanism can dig into the ground while on the other hand if there is not sufficient weight, the cutter mechanism will not follow the irregularities of the ground to the required extent.

In order to avoid these problems it has already been proposed to provide the cutter mechanism of the harvester with ground skids. However with conventional constructions these ground skids are always situated so far behind the cutting line that the cutter mechanism is only raised when the cutting beam has already travelled beyond the obstruction or undulation in the ground. Moreover, such conventional ground skids increase the resistance with respect to the ground and tend to push loose earth in front of themselves so that the earth accumulates undesirably in front of the cutter beam even after a relatively few meters of travel.

It has already been proposed to attach to the mower a support leg which extends in the direction of travel while attaching to the rear end thereof a rearwardly extending skid which slides along the ground. Such a construction has proved to be of practical utility inasmuch as it fulfills the required purpose in a satisfactory way, since it is capable of supporting the residual weight of the cutter table. However, when encountering particularly loose earth it does not infrequently happen that the earth accumulates in front of the skid to such an extent that movement of the cutter mechanism is obstructed, and the result is that the cutter mechanism must be frequently cleaned.

Also, it has been proposed to provide the support let with a sharply-tapering skid shoe which extends rearwardly from the support leg while attaching to the forward end thereof a slide rail which extends beneath the support leg and under the skid shoe while providing the possibility of longitudinal movement between the skid shoe and the slide rail. While such a construction does have certain advantages, it is relatively expensive and in addition earth becomes lodged very easily in the open triangle which is formed by the support leg, the slide rail, and the skid shoe particularly when the assembly moves along sharply inclined ground and when the combine harvester skids laterally. In such a case the entire ground skid is displaced laterally with respect to the direction of travel. Furthermore, it has been found difficult to design the slide rail and skid shoe, both of which extend beneath the cutting line, in such a way that they do not collide with the body of the cutter mechanism, these cutter mechanism bodies differing in design from one type of harvester to another.

SUMMARY OF THE INVENTION

It is accordingly a primary object of the present invention to provide a ground skid of the above general type which will avoid the above drawbacks.

In particular, it is an object of the present invention to provide a ground skid with a construction according to which a slide rail thereof will be capable of reliably following ground irregularities while substantially eliminating the possibility of digging into the ground or undesirably accumulating earth in advance of the ground skid.

In particular, it is an object of the present invention to provide a construction which according to one embodiment is suited for average irregularities in the ground and which according to another embodiment is particularly suited for unusually large irregularities which may be encountered in the ground.

It is in particular an object of the present invention to provide a construction which is capable of avoiding any difficulties in connection with the ground skid when the slide rail thereof reaches the crest of an irregularity in the ground and starts to move downwardly along the ground irregularity.

Moreover, it is an object of the present invention to provide for the slide rail of the ground skid a springy support which is not too soft or too hard so that an ideal yieldability is achieved.

Furthermore it is an object of the present invention to provide a ground skid of the above general type which is characterized by relatively simple inexpensive construction which at the same time is rugged and highly reliable in operation.

According to the invention the ground skid includes an elongated slide rail which is adapted to engage and slide along the ground, this slide rail extending longitudinally in the direction of travel and having an elongated intermediate substantially straight portion and opposed front and rear end regions which are respectively inclined upwardly and forwardly and rearwardly from the intermediate substantially straight portion. A springy support leg has an upper rear portion carrying a means for attaching the springy support leg to the mower of the harvester. This springy support leg has a lower front straight region which extends longitudinally along the intermediate substantially straight portion of the slide rail and is fixed thereto. Directly next to this front lower portion, the springy support leg has an upwardly and rearwardly inclined portion forming a predetermined angle with the lower front portion, and at the intersection between these portions, there is defined a pivot axis about which the slide rail and springly support leg are capable of turning one with respect to the other in response to engagement between ground irregularities and the slide rail. This pivot axis is situated along the intermediate portion of the slide rail at a location forwardly of a central region of the intermediate portion which is situated midway between the front and rear end regions thereof.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
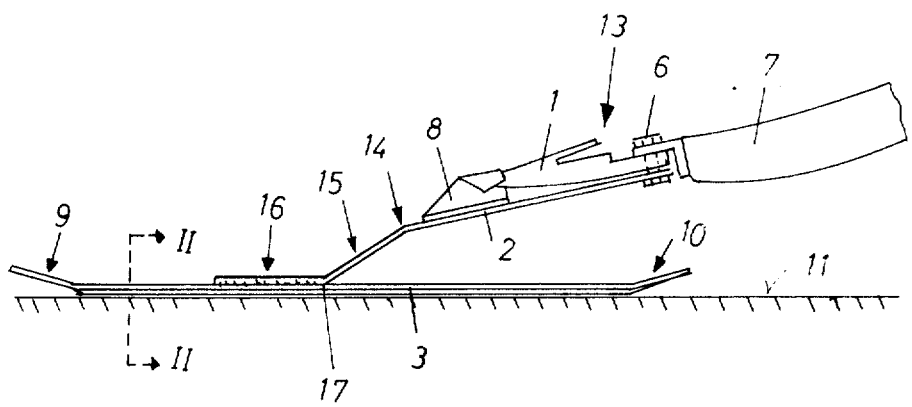
FIG. 1 is a side elevation of one possible embodiment of a ground skid according to the invention.

Referring to FIG. 1 it will be seen that the illustrated ground skid attachment is carried by a mower finger 1 which is fixed in a known way by a bolt 6 to the cutter beam 7. Thus, the illustrated attachment includes an elongated springy support leg 2 made of a tough springy flat sheet material, this support leg 2 carrying at its upper rear portion, as viewed in FIG. 1, a means for attaching the support leg to the finger 1. The support leg 2 has a lower elongated straight front portion 16 which is fixed to an elongated intermediate substantially straight portion of a slide rail 3 which is adapted to directly engage and slide along the ground 11. For the purpose of fixing the support leg 2 to the mower of the harvester, the upper rear extremity of the support leg may be notched to receive the shank of the bolt 16, so that a nut at the bottom of the bolt may be tightened against the upper rear extremity of the support leg 2. In addition, the upper surface of the upper rear portion of the support leg 2 is fixed with a strap 8 which extends upwardly from the support leg 2 and which has at its upper end a curved portion extending around and engaging the upper front surface region of the finger 1, so that by way of this strap 8 the support leg 2 is hung, in part, from the finger 1. Initially the inherent springiness of the support leg 2 situates the hanger 8 below the finger 1. Thus, the support leg 2 is deflected upwardly at its upper rear region in order to situate the hanger 8 around the finger 1 in the manner illustrated in FIG. 1. Thus, the hanger 8 as well as the notched rear end extremity of the support leg 2 form a means for attaching the support leg to the mower, with the attachment being such that the springy force of the upper rear region of the support leg 2 presses the upper portion of the hanger 8 downwardly against the top surface of the finger 1 at the front region of the latter.

The elongated slide rail 3 which together with the elongated support leg 2 extend forwardly and rearwardly in the direction of travel is also made of a tough springy metal which is substantially flat. This slide rail 3 has, as shown in FIG. 1, an intermediate elongated substantially straight portion, which extends almost through the entire length of the slide rail 3, this slide rail 3 having the relatively short front and rear end regions 9 and 10 which are inclined upwardly as well as forwardly and rearwardly, respectively. These end regions 9 and 10 can be tapered so as to have a substantially pointed configuration, so that the extremities of the end regions 9 and 10 are substantially pointed. While this slide rail 3 is substantially flat, as pointed out above, as may be seen in particular from FIG. 2, it is preferable to provide the rail 3 with a slight transverse curvature so that it has a downwardly directed convex surface 12 which engages the ground 11. This feature improves the sliding properties of the slide rail 3 to a considerable extent.

Just to the rear of its elongated straight lower front portion 16 which is fixed, as by welding, to the top surface of the slide rail 3, the support leg 2 has a portion 15 which is inclined upwardly and rearwardly from the portion 16 and which is also straight so that it intersects the portion 16 at a predetermined angle which provides at 17 a pivot axis extending transversely across the rail 3. At this pivot axis 17 it is possible for the rail 3 and the springy support leg 2 to turn one with respect to the other when the slide rail 3 engages irregularities in the ground 11. This straight portion 15 which thus defines the pivot axis 17 with the straight portion 16 has a length which is generally on the order of 10–15 cm, and at its upper end this portion 15 intersects the upper rear portion of the springy support leg 2 at the angle 14 which forms between the upper rear portion of the support leg 2 and the portion 15 a second pivot axis where the part 15 can turn with respect to the upper rear portion of the springy support leg 2. Thus, with this embodiment of the invention in response to engagement between ground irregularities and the slide rail 3 it is possible for the latter to tilt with respect to the springy leg 2 at the axis 17 and the springy leg 2 is itself capable of turning at its portion 15 with respect to the upper rear portion of the springy leg 2 at the axis situated at the angle 14. As is apparent from FIG. 1, the axis 17 is situated forwardly of a central region of the intermediate straight portion of the slide rail 3 which is situated midway between the end regions 9 and 10. Thus, if the length of the rail 3 is divided into thirds, the axis 17 is situated in the middle third of the length of the slide rail 3 but forwardly of the center thereof. Because of the relatively long length of the portion 16 which is fixed along its entire length, as by welding, to the slide rail 3, an exceedingly stable connection is provided between the slide rail 3 and the springy support leg 2. Instead of a welded connection, however, it is possible to releasably interconnect the parts 2 and 3 so that when the part 3 becomes worn it can readily be replaced. For this purpose suitable bolts or rivets may be provided.

Figure 3:
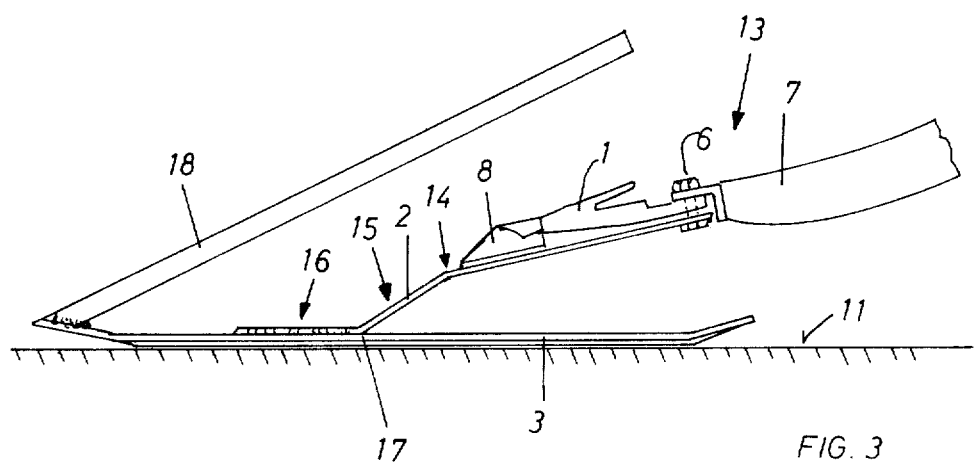
FIG. 3 shows the construction of FIG. 1 with a stocklifter attached thereto.

As is shown in FIG. 3, it is possible to fix to the front end region 9 an elongated stock lifter bar 18 which is fixed, as by welding, to the upper front surface of the end region 9 and projects rearwardly and upwardly therefrom. It will be noted that the stock-lifter 18 forms an acute angle with the ground 11.

It will be seen that with the above-described structure of the invention there is no closed triangular frame structure in which earth can become lodged. In addition, the pressure resulting from the weight of the cutter mechanism and acting vertically on the slide rail is distributed from the center of the slide rail forwardly and rearwardly therealong so that the stress at the front and rear ends of the slide rail is at a minimum while the stress at the connection between the slide rail and the support leg is at a maximum. By providing the upwardly inclined end regions 9 and 10 the slide rail can reliably travel along the ground without digging into the earth, even under relatively unfavorable ground conditions. Because there is no rear skid portion the cutter mechanism will no longer become clogged with earth and the skid of the invention is relatively inexpensive. This factor is of importance inasmuch as several of the ground skids of the invention are always mounted on a combine harvester.

Because of the capability of tilting between the slide rail 3 and the support leg 2 at the transverse axis 17 and turning between the upper rear portion of the support leg 2 and the portion 15, at the angle 14, an exceedingly effective resilient support of the residual weight of the cutter table on the ground is provided.

Moreover, while a particular type of attachment means is shown and described for attaching the upper rear portion of the support leg 2 to the mower of the harvester, other suitable attaching means can be provided.

As was pointed out above, by providing a releasable connection between the support leg 2 and the slide rail 3 the latter can be readily replaced. The curved surface 12 at the bottom of the slide rail prevents the latter from digging into the ground when the harvester executes turns. Moreover this feature improves the sliding properties of the slide rail on the cultivated ground. The tapered substantially pointed front end 9 avoids resistance with respect to the standing crop and in addition the ground resistance is maintained at a minimum. While the illustrated slide rail 3 is straight between its end regions 9 and 10 it also may be slightly curved so that the lower surface of the slide rail 3 is also convex in a forward and rearward direction, perpendicular to the plane of FIG. 2. Since the stock-lifter 18 will be exposed substantially to the same wear as the slide rail 3, these parts 3 and 18 can be welded together since they will most often require replacement at the same time.

Figure 6:
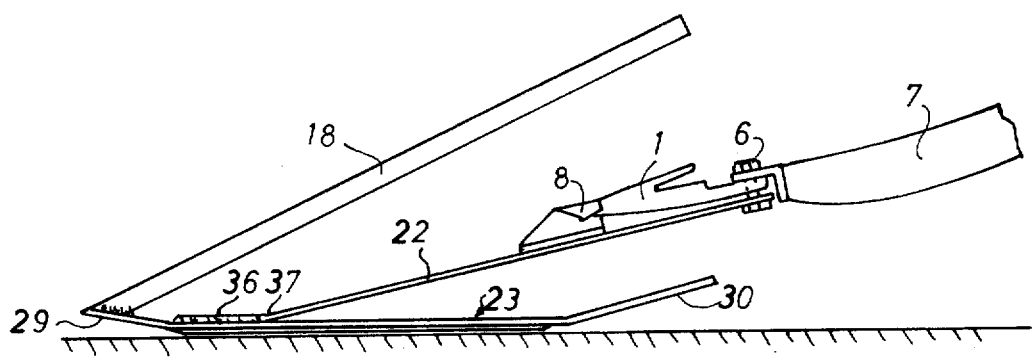
FIG. 6 shows the attachment of FIG. 4 provided with a stock lifter.
Figure 5:
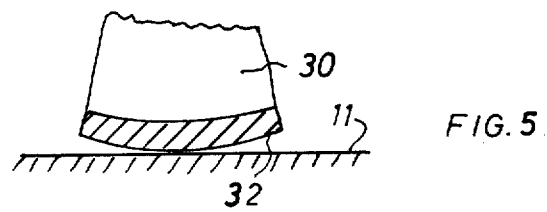
FIG. 5 is a transverse section of the slide rail of FIG. 4, taken along line V—V of FIG. 4 in the direction of the arrows and fragmentarily showing part of the rear end region of the slide rail of FIG. 4.
Figure 4:
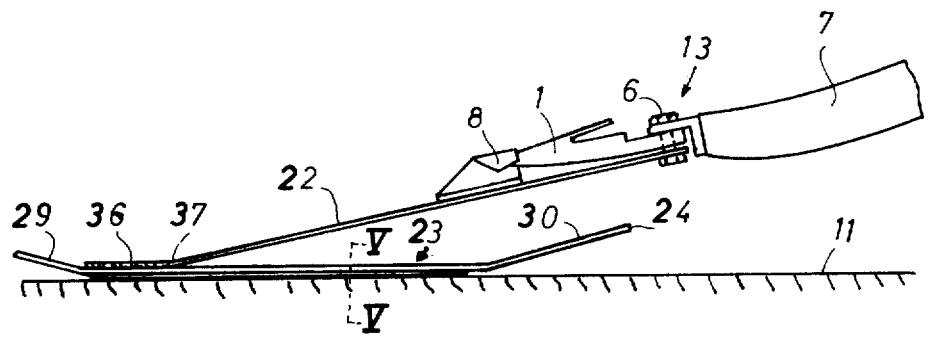
FIG. 4 is a side elevation of a further embodiment of a ground skid according to the invention.

While the above-described structure of the invention will effectively achieve the desired results in most cases which are usually encountered in practice, it may sometimes happen that the ground irregularities are particularly pronounced, and thus when encountering large steeply inclined irregularities it is preferable to provide a construction as shown in FIGS. 4-6 according to which the pivot axis between the slide rail and support leg is displaced further toward the front end region of the slide rail. Moreover, with the embodiment of FIGS. 4-6 a softer springy mounting of the slide rail is provided since the springy support leg of FIGS. 4-6 is bent with respect to its lower front portion only at the transverse tilting axis between the slide rail and the springy support leg while the latter otherwise remains straight, as is apparent from FIGS. 4 and 6.

Figure 2:
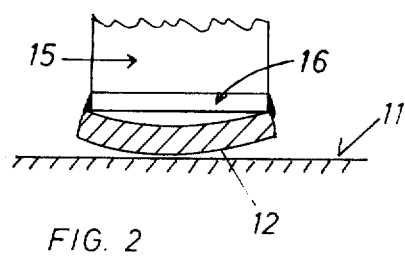
FIG. 2 is a transverse section taken along line II—II of FIG. 1 in the direction of the arrows, FIG. 2 illustrating a support leg in a fragmentary manner.

Thus, referring to FIGS. 4-6 it will be seen that the springy support leg 22, which corresponds to the above support leg 2, is provided at its upper rear portion with an attaching means identical with that of FIGS. 1-3, so that the upper rear portion of the springy support leg 22 is attached to the finger 1 in the manner described above. It will be seen that from the hanger 8 the springy support leg 22 extends without any angle all the way down to the intersection with the lower front portion 36 which is fixed as by welding along its entire length to the upper surface of the slide rail 23 which corresponds to the slide rail 3. Thus, at the intersection with the lower front portion 36 the support leg 22 defines the transverse tilting axis 37 where the slide rail 23 and support leg 22 are capable of tilting mutually one with respect to the other in response to engagement with ground irregularities. In this case also the welding of the elongated portion 36 of the support leg 22 to the slide rail 23 provide an exceedingly stable connection, although a removable connection by suitable bolts or the like may also be provided so that the slide rail 23 can readily be replaced as described above. As was the case with FIGS. 1-3 the support leg 22 can be made of a tough springy substantially flat strip of metal so that the slide rail 23 is supported in a springy yieldable manner with respect to the finger 1.

The slide rail 23 is also made of a substantially flat springy tough metal while also being provided with upwardly and rearwardly inclined elongated front and rear end regions 29 and 30 as illustrated. The front end region 29 is tapered so as to terminate in a substantially pointed tip, so that in this way there will be no great resistance with respect to grain stocks which are encountered during operation of the harvester. In this case also it will be noted that between the end regions 29 and 30 the slide rail 23 has an elongated substantially straight intermediate portion. However, it is preferred to provide the intermediate portion of the slide rail 23 with the transverse curvature apparent from FIG. 5, so that the slide rail has a downwardly directed convex surface 32 which engages the ground 11. This feature improves the sliding properties of the slide rail considerably.

In the embodiment of FIGS. 4-6 the rear region 30 is inclined upwardly and rearwardly in such a way that it is substantially parallel to the springy support leg 22 at the portion thereof which extends upwardly and rearwardly from the transverse tilting axis 37. Moreover, the length of the rear region 30 is such that its rear extremity 24 is situated beneath the finger 1.

With this construction when the slide rail 23 encounters a sharply rising irregularity in the ground, then during movement upwardly along such an irregularity the front region 29 is raised and the rail 23 slides over the irregularity. While the cutting mechanism still maintains its required height above the ground, the slide rail 23 tilts with respect to the support leg 22 at the transverse axis 37, while this axis is raised upwardly with the progressive rise of the skid upwardly along the elevation in the ground. The finger 1 is capable of following the movement of the skid as a result of its springy connection with the slide rail 23 by way of the support leg 22. As soon as the axis 37 reaches the crest of the ground irregularity, the part of the rail 23 situated forwardly of the axis 37 suddenly tilts downwardly and the part of the rail 23 extending rearwardly from the transverse tilting axis 37 will thus swing upwardly while the finger 1 continues to be pressed downwardly by the weight of the cutting mechanism which is yieldably resisted by way of the attachment of the invention. In cases where an extreme load is provided under these conditions, the lower surface of the support leg 22 situated beneath the finger 1 directly engages the rear extremity 24 of the rear region 30 of the slide rail 23. Thus, under these conditions the rear portion 30 of the slide rail 23 carries a part of the residual weight of the cutting table and serves further to yieldably resist and damp the downwardly directed springy movement of the finger 1. For this purpose it is preferred to make the slide rail 3 of a tougher somewhat harder springy metal than the support leg 22 so that the harder springy force of the rear portion 30 of the slide rail 23, as compared with the softer springy force of the support leg 22, will serve effectively to take up this added load under the above extreme conditions. As soon as an extreme ground irregularity of this latter type has been travelled over, the slide rail 23 and the support leg 22 return due to their inherent resiliency to their initial positions.

When it is expected to encounter even more extreme irregularities in the ground, it may be advisable to provide a construction according to which the rear region 30 of the slide rail 23 extends to the rear to an even greater extent so that its rear extremity will engage not beneath the finger 1 but rather beneath the holder 7 for the finger 1. However, even in such a construction the rear portion of the slide rail should not extend so far beyond the cutting line that it will in any way interfere with the cutting operations.

As was the case with FIG. 3, FIG. 6 illustrates how the embodiment of FIG. 4 may be provided with a stock-lifter bar 18. Such a construction is of course preferred in those cases where it is required to operate with stocks which have been flattened toward the ground as a result of weather conditions or other influences.

Thus, it will be noted that as compared with FIGS. 1-3, the embodiment of FIGS. 4-6 situates the transverse tilting axis 37 even further forwardly with the elongated front lower portion 36 of the support leg 22 being situated directly behind the front region 29 of the slide rail 23. Moreover, the support leg 22 extends without any other bends, angles, or the like, all the way up from the axis 37 to the bolt 6, so that a softer springy mounting is provided with this construction. With the embodiment of FIGS. 1-3 a harder springy force is transmitted between the rail 3 and the table 7. Thus, while the embodiment of FIGS. 1-3 is satisfactory for normal conditions, when operating with extremely irregular terrain it is possible for the embodiment of FIGS. 1-3 to dig into the ground at the front end of the slide rail 3 in a highly undesirable manner which might in some cases result in tearing of the attachment away from the mower, whereas the embodiment of FIGS. 4-6 avoids such a possibility so that this embodiment is particularly preferred for exceedingly rough ground conditions.

As was pointed out above, the embodiment of FIGS. 1-3 provides a harder springy mounting than the embodiment of FIGS. 4-6 where the support leg 22 provides a softer springy mounting. Thus with the embodiment of FIGS. 1-3 it is possible for jolting forces to be transmitted in pulsations to the mechanism 7 whereas with the embodiment of FIGS. 4-6 the softer mounting will avoid such jolts and sudden stresses. Thus, while the embodiment of FIGS. 4-6 retains most of the advantages of the embodiment of FIGS. 1-3, this particular embodiment of FIGS. 4-6 is specially suitable for extremely severe operating conditions. With both embodiments of the invention it will be seen that an exceedingly simple construction which is relatively inexpensive is provided without requiring any substantial change in the different types of harvester mowers which are adapted to receive the structure of the invention. Thus whereas with the embodiment of FIGS. 1-3 the front portion 16 of the support leg 2 is attached to the middle third of the slide rail 3, with the embodiment of FIGS. 4-6 the front portion 36 of the support leg 22 is attached to the front third of the slide rail 23.

Thus it will be seen that with the embodiment of FIGS. 4-6, as soon as the axis 37 moves beyond the crest of a rise in the ground, the relatively short portion of the slide rail 23 forwardly of the tilting axis 37 will suddenly tilt downwardly but will not dig into the ground. It will be noted that the upward inclination of the front end region 29 contributes to this result. Moreover, the elongated relatively straight portion of the support leg 22 extending upwardly from the axis 37 contributes also to the soft springy mounting of the embodiment of FIGS. 4-6.

On the other hand, in the case of extreme irregularities in the ground this soft springy mounting of the embodiment of FIGS. 4-6 might lead to a sharp sinking of the cutting mechanism when the latter presses downwardly due to its relatively great weight. However, this undesirable result is avoided by way of the elongated rear region 30 the length of which is such that its extremity 24 is situated beneath the finger 1. Thus, as a result of this feature if there should be a tendency for an extremely sudden sharp sinking of the cutting mechanism the lower surface at the upper rear portion of the support leg 22 engages the rear tip 24 of the slide rail 23 so that the weight of the cutting mechanism is now supported by the rear portion 30 which has a stiffer springy characteristic than the support leg 22, as pointed out above. In this way the cutting mechanism continues to be yieldably and resiliently supported even under these extreme conditions. The arrangement of FIGS. 4-6 according to which the portion 30 of the rail 23 extends parallel to the upwardly and rearwardly inclined portion of the springy support leg 22 is particularly favorable for this purpose. Thus, if the rear portion 30 were inclined upwardly at a sharper angle than that shown in FIGS. 4 and 6, the part of the support leg 22 beneath the finger 1 would engage the tip 24 after a relatively small amount of springy deflection and undesirable damage might result under these conditions. On the other hand, if the rear region 30 of the slide rail 23 were flatter, which is to say inclined at a less sharp angle than that illustrated in FIGS. 4 and 6, the springy supporting characteristic would be too soft and the downwardly directed movement of the finger would be insufficiently damped.

Of course, it is also possible, as pointed out above to situate the rear end of the slide rail at a distance situated rearwardly even further than that illustrated in FIGS. 4 and 6 by lengthening the rear portion 30, so that in this case the structure which holds the finger 1 will engage the rear end extremity of the slide rail under the above conditions. With such a construction there is, under the above extreme conditions, no stressing or undesirable loading either of the finger 1 or the support leg 22. Of course, in certain special cases it may be desirable to provide the springy support leg 22 with an additional angular configuration such as that shown at 14 in FIGS. 1-3 in order to adapt the support leg in special cases to a particularly desired inclination of the cutting mechanism.

As was the case with the embodiment of FIGS. 1-3, it is also possible with the embodiment of FIGS. 4-6 to provide for the bottom surface of the elongated intermediate substantially straight region of the slide rail 23 a relatively slight convex curvature considered in the front-to-rear direction.

Thus, it will be seen that with both embodiments of the invention an exceedingly simple and robust construction is provided which is capable of meeting all problems which may be encountered during use of the structure. Thus the embodiments of the invention can be readily used with normal ground conditions as well as with relatively loose earth or with terrain which has extreme irregularities with areas of sharp inclination. The weight of the cutting table is very effectively supported by the slide rail of the invention in a yieldable resilient manner even under extreme conditions when strong springy forces are transmitted to the slide rail with the latter being capable of providing the required support particularly as a result of its special rear construction as described above.

What is claimed is:

1. A ground skid for mowers of harvesters, comprising an elongated slide rail adapted to engage and slide along the ground, said slide rail having an elongated substantially straight intermediate portion and opposed front and rear end regions which are both inclined upwardly from said elongated straight intermediate portion, while respectively extending forwardly and rearwardly therefrom, and an elongated springy support leg having a rear upper portion carrying a means for attaching said springy support leg to the mower, said springy support leg having a lower front elongated straight portion fixed to and extending longitudinally along said intermediate straight portion of said rail at an upper surface of said intermediate straight portion, and said support leg having next to said front straight lower portion thereof an upwardly and rearwardly inclined straight portion intersecting said front lower portion thereof at a predetermined angle and defining therewith a pivot axis extending transversely across said rail and support leg for interconnecting said support leg and rail for mutual turning movement at said axis one with respect to the other in response to engagement of said slide rail with ground irregularities so that said springy support leg and rail are capable of yieldably turning one with respect to the other at said pivot axis, said lower straight front portion of said springy support leg and said pivot axis at the rear end thereof being situated forwardly of a central region of said intermediate portion of said slide rail which is situated midway between said front and rear end regions of said slide rail.

2. The combination of claim 1 and wherein said lower front portion of said support leg is fixed to said intermediate portion of said slide rail at a location closely adjacent to said front end region of said slide rail.

3. The combination of claim 1 and wherein said lower front portion of said support leg is spaced rearwardly from said front end region of said slide rail.

4. The combination of claim 1 and wherein said springy support leg is made of a flat springy sheet material.

5. The combination of claim 1 and wherein said mower has a finger extending forwardly from the remainder of said mower and a bolt fixing said finger at a rear end thereof to the remainder of said mower, said upper rear portion of said springy support leg being connected to said bolt to be partly connected thereby to said mower at said means for attaching said upper rear portion of said support leg to said mower including a strap fixed to an upper surface of said support leg at said upper rear portion thereof and extending around and over a front end region of said finger.

6. The combination of claim 1 and wherein said upper rear portion of said springy support leg is straight and extends at a predetermined angle upwardly and rearwardly from the portion of said springy support leg which forms said pivot axis with said front lower portion thereof.

7. The combination of claim 1 and wherein the mower has a finger to which said upper rear portion of said springy support leg is attached, and said rear end region of said slide rail terminating beneath said finger.

8. The combination of claim 7 and wherein said upper rear portion of said springy support leg and said rear end region of said slide rail are parallel to each other.

9. The combination of claim 1 and wherein said front lower portion of said springy support leg is welded to said slide rail.

10. The combination of claim 1 and wherein an elongated stalk-lifting leg is fixed to and extends upwardly and rearwardly from said front end region of said slide rail.

* * * * *